(12) United States Patent
Binder

(10) Patent No.: US 7,096,262 B2
(45) Date of Patent: Aug. 22, 2006

(54) APPARATUS AND METHOD FOR ASYMMETRIC ELECTRONIC COMMERCE TRANSACTIONS

(75) Inventor: Garry C. Binder, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 654 days.

(21) Appl. No.: 09/815,497

(22) Filed: Mar. 22, 2001

(65) Prior Publication Data

US 2002/0138553 A1   Sep. 26, 2002

(51) Int. Cl.
*G06F 15/173* (2006.01)

(52) U.S. Cl. .................. 709/224; 709/223; 709/217

(58) Field of Classification Search ............. 709/203, 709/205–207, 216, 223–225, 217–219, 212–213, 709/227, 231

See application file for complete search history.

(56) References Cited

U.S. PATENT DOCUMENTS

| | | | | |
|---|---|---|---|---|
| 5,790,770 A * | 8/1998 | McClure et al. | ............ | 709/231 |
| 6,167,448 A * | 12/2000 | Hemphill et al. | ........... | 709/224 |
| 6,295,551 B1 * | 9/2001 | Roberts et al. | ............. | 709/205 |
| 6,457,879 B1 * | 10/2002 | Thurlow et al. | ............ | 709/206 |
| 6,721,797 B1 * | 4/2004 | Kim | ........................... | 709/232 |
| 2002/0010776 A1 * | 1/2002 | Lerner | ........................ | 709/225 |

OTHER PUBLICATIONS

Sol, Selena, Parts of an HTTP Transaction: The Request; Sep. 20, 1999; Web Developer's Virtual Library; http://www.wdvl.com/Authoring/Tools/Tutorial/index5.html; Mar. 19, 2001; 5 pages.
Sol, Selena, Parts of an HTTP Transaction: The Response; Sep. 20, 1999; Web Developer's Virtual Library; http://www.wdvl.com/Authoring/Tools/Tutorial/response.html; Mar. 19, 2001; 2 pgs.
HTTP Request Methods; Web Developer's Virtual Library; http://www.stars.com/Internet/Protocols/HTTP/Request.html; Mar. 19, 2001; 2 pgs.
HTTP Response; Web Developer's Virtual Library; http://www.wdvl.com/Internet/Protocols/HTTP/Response.html; Mar. 19, 2001; 1 pg.
post-Perform HTTP POST; Gunnar R\nning; Jun. 4, 1997; http://www.candleweb.no/doc/spec/node121.html; Mar. 19, 2001; 1 pg.

* cited by examiner

*Primary Examiner*—Ario Etienne
*Assistant Examiner*—Hussein Elchanti
(74) *Attorney, Agent, or Firm*—Blakely, Sokoloff, Taylor & Zafman LLP

(57) ABSTRACT

A networked computing apparatus having a business message sender component coupled to a network interface, the network interface not being coupled to an always-active listening component; and a processing component coupled to the sender component to process a business message or a polling request for transfer to another networked computing apparatus is disclosed.

27 Claims, 14 Drawing Sheets

200 OK is sent from the Server in response to Client POST indicating that the file has been received successfully. Queued message is attached and sent back to Client Server has asynchronously processed the data and has queued a Receipt Acknowledgement

APPARATUS AND METHOD FOR ASYMMETRIC ELECTRONIC COMMERCE TRANSACTIONS

FIELD OF THE INVENTION

The field of the invention relates to electronic commerce and systems for managing transactions via a computer network.

BACKGROUND OF THE INVENTION

Electronic commerce between buyers and sellers on a computer network such as the Internet has become ubiquitous. There are many existing systems and websites for handling electronic commerce transactions. Typically, these websites employ sophisticated and expensive servers and software systems for creating an Internet presence for electronic commerce. One such conventional e-commerce system is RosettaNet. The RosettaNet system, including the core of the RosettaNet implementation framework, includes a specification and protocol for the packaging, routing, and transferring of RosettaNet business messages in support of electronic commerce between networked trading partners. Other conventional e-commerce systems specify a structured protocol for e-commerce transactions via a network.

Although many conventional e-commerce systems exist, there are numerous problems associated with these conventional systems. For example, the implementation of a web presence in support of conventional e-commerce is very expensive. For example, a typical RosettaNet implementation can cost over $100, 000. The high expense of these conventional systems is due in part to the need for high-quality Internet connectivity and round-the-clock monitoring and support of e-commerce transactions. Conventional e-commerce systems, including RosettaNet, require that trading partners in a networked e-commerce system must constantly listen for pushed e-commerce messages from other trading partners. Reliable systems for constantly listening for e-commerce messages are very expensive. Further, because such systems must be always operating, additional expense is incurred by providing back-up or fail-over systems to assure the reliability of the e-commerce system. Additional expense is necessary because of the extensive monitoring and support of such systems.

Other problems are associated with these conventional e-commerce systems. There can be substantial risk associated with providing an always-active inbound connection to an e-commerce trading partner system. Such conventional systems must provide additional infrastructure for protecting enterprise resources and intranets from inappropriate access from external networked intruders. This additional infrastructure includes the purchase and installation of firewalls, routers, packet filter capabilities, and potentially DMZ. Additionally, intrusion detection in these conventional e-commerce systems must be provided.

Thus, an improved electronic commerce system is needed.

BRIEF DESCRIPTION OF THE DRAWINGS

The present invention is illustrated by way of example and not limitation in the figures of the accompanying drawings, in which.

DETAILED DESCRIPTION OF THE INVENTION

Figure 1:
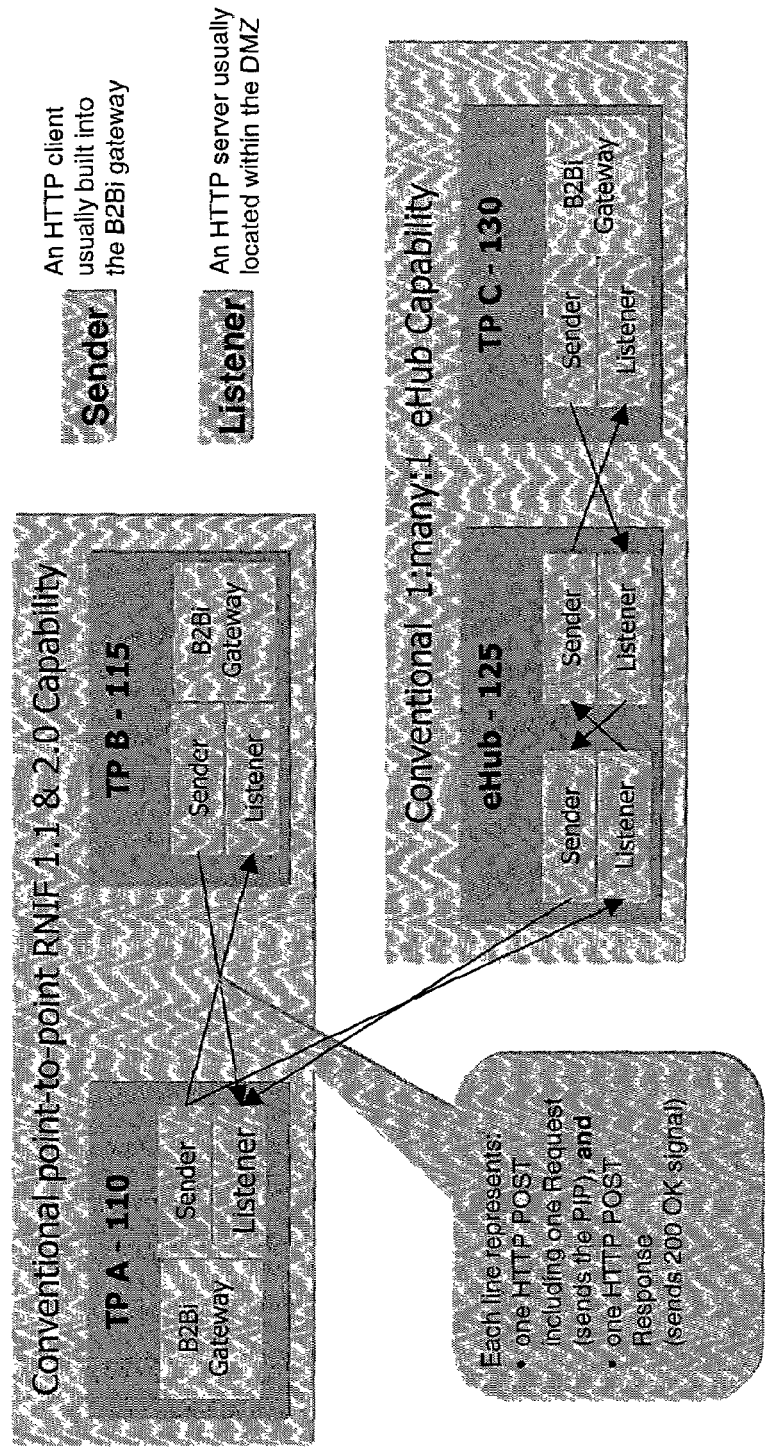
FIG. 1 illustrates the conventional symmetric architecture of the prior art.

The present invention is an asymmetric electronic commerce apparatus and method. In the following detailed description, numerous details are set forth in order to provide a thorough understanding of the present invention. However, it will be apparent to one of ordinary skill in the art that these specific details need not be used to practice the present invention. In other circumstances, well-known structures, materials, circuits, processes, and interfaces have not been shown or described in detail in order not to unnecessarily obscure the present invention.

An organization's business processes can be divided into two broad categories. The business processes that are internal to the organization are called "private processes," while the business processes that involve interactions with trading partners are known as "public processes."

The public processes are business processes through which partners conduct e-business. Within the context of an e-commerce system such as RosettaNet, these are the partner interface processes (PIP) that are visible between trading partners. Public processes implement the RosettaNet PIP specifications to exchange standard business documents over standard Internet transfer protocols, as specified by the RosettaNet Implementation Framework (RNIF).

Within trading partner enterprises, private processes interface with public processes and with back-end business systems as needed to facilitate e-business exchanges between trading partner organizations.

A major part of RosettaNet's standardization effort is the alignment of business processes between trading partners in a given supply chain (such as the IT Products and Electronic Component supply chains). RosettaNet specifies these as Partner Interface Process (PIP) specifications.

RosettaNet divides the entire e-business supply chain domain for which PIPs are specified into broad classifications called "clusters". Each cluster is further sub-divided into two or more "segments". Each segment comprises several PIPs. PIPs contain one or more Activities, and Activities in turn specify Actions. An example of this relationship follows:

CLUSTER 3: Order Management
    Segment A: Quote and Order Entry
        PIP 3A4: Manage Purchase Order
            Activity: Create Purchase Order
                Action: Purchase Order Request
    Segment B: Transportation and Distribution
    Segment C: Returns and Finance
    Segment D: Product Configuration Each PIP in a segment represents a well-defined business process subset. PIPs include specification of partner business roles (Buyer, Seller etc.); business activities involved between the roles; and type, content, and sequence of business documents exchanged by the role-interactions while performing these activities. They also specify the time, security, authentication, and performance constraints of these interactions. Structure and content of the business documents exchanged is specified through XML Document Type Definitions (DTDs) and associated Message Guidelines.

Trading partners that participate in a RosettaNet e-commerce environment exchange business documents that conform to the DTDs and Message Guidelines in the subject PIP specification, using network protocols that are specified and supported by the RosettaNet Implementation Framework (RNIF). Current PIP specifications are based on a Peer-to-Peer business message exchange model, between the RosettaNet networked applications (and hence the trading partners). That is, RosettaNet messages are exchanged between two trading partners directly. This peer-to-peer mode of message exchange relies on prior knowledge of the peer network entity identities and their addresses, which should be exchanged by the trading partners in advance. RosettaNet also provides a mechanism to facilitate exchange of these messages through a third-party routing entity such as a hub (a.k.a. intermediary). However, this mechanism is still based on the peer-to-peer message exchange model as far as the PIP is concerned. That is, the business entities involved in the exchange are still two: the originator and the final recipient, with the Hub simply facilitating the routing and delivery of the messages.

As can be understood from the description of the conventional RosettaNet implementation framework, each e-commerce trading partner must listen for pushed business messages originated by another trading partner. As described earlier, this requirement to always listen for messages increases the cost and decreases the security of conventional e-commerce systems. The present invention however provides additional functionality to e-commerce systems, including the RosettaNet implementation framework, for implementing an asymmetric e-commerce transaction which does not require an always-active listening component. In one embodiment of the present invention, the conventional HTTP POST request/response protocol is employed to provide an asymmetric HTTP transaction capability. By use of the present invention, efficient electronic commerce can be realized without the need for an HTTP server or the persistent reservation of inbound connections. As will be described in more detail below, a trading partner in the environment of the present invention initiates an asymmetric HTTP electronic commerce transaction with another networked trading partner without the need for either trading partner to use an expensive listening component as required in conventional systems.

In one embodiment of the present invention, the conventional HTTP POST method is used for initiating and responding to an asymmetric HTTP transaction employed in the present invention. It will be apparent to one of ordinary skill in the art that other methods or functions provided by other conventional protocols may equivalently be used to enable the asymmetric electronic commerce transactions of the present invention. Conventional HTTP protocol provides two primary methods to request documents: GET and POST. In the first implementation of the HTTP protocol, the definition of the GET method was provided to enable a web browser to request a specific document. The HTTP 1.0 protocol was developed from 1992 to 1996 in order to satisfy the need to exchange more than simple text information. The POST method of input was part of an important change brought about by the introduction of HTTP 1.0. The POST method allows web browsers to send an unlimited amount of data to a web server by allowing them to tag it onto an HTTP request after the request headers add the message body. Under HTTP 1.0, an HTTP transaction consists of a header followed by an empty line and then some extra data. In the present invention, this conventional transfer protocol structure is used to transfer business message requests and responses as part of the extra data portion of an HTTP POST method transaction. The details of these requests and response transactions employed in the present invention are described in more detail below.

Referring to FIG. 1, the conventional point-to-point RosettaNet implementation framework (RNIF) for electronic commerce is illustrated. In the conventional system, a trading partner A (TP-A) 110 includes a sender component, a listener component, and a gateway component. Similarly, another trading partner B (TP-B) 115 includes a sender component, a listener component, and a gateway component. In the typical conventional implementation, the sender component in each trading partner is an HTTP client usually built into the business-to-business (B2B) gateway. Similarly, the listener component in each trading partner is conventionally implemented as an HTTP server usually located within the DMZ. In a typical e-commerce transaction in the environment of the prior art, a sender such as the sender component of trading partner A 110 sends a request to another trading partner using a conventional HTTP POST method, the request including a partner interface process (PIP) specifying a business activity and action. Because the listener component of trading partner B 115 is always active, the listener component will receive the request sent by the sender of trading partner A 110. The trading partner B 115 may then act on the business request received through the listener component from trading partner A 110. Trading partner B 115 also prepares a response to the business request received from trading partner A 110. This response, implemented in the prior art as an HTTP POST response is sent from the sender component of trading partner B 115 to the listener component of trading partner A 110. Again, because the conventional implementation requires an active listener component, trading partner A 110 will receive the response from trading partner B 115 indicating the status of the business transaction request originally sent by trading partner A 110.

In a similar manner, a hub 125 may be used to route business transaction requests between two trading partners, each of who may be acting as network clients. In a typical conventional e-commerce implementation using a hub, trading partner A 110 uses its sender component to send a business request to trading partner C 130 via hub 125. One listener component of hub 125 receives the business request from the sender component of trading partner A 110. The business request thus received is transferred from a listener of hub 125 to a sender of hub 125. Subsequently, a sender of hub 125 forwards the business request to the listener component of trading partner C 130. Upon processing the business request, trading partner C 130 issues a response to trading partner A 110 via hub 125. This response is sent from the sender component of trading partner C 130 through a listener component of hub 125. The listener component of hub 125 transfers the response to a sender component of hub 125, which sends the response to the listener component of trading partner A 110. Thus, the conventional e-commerce business transactions are transferred between senders and listeners of each of a plurality of trading partners on a network either directly or through a conventional hub.

Figure 2:
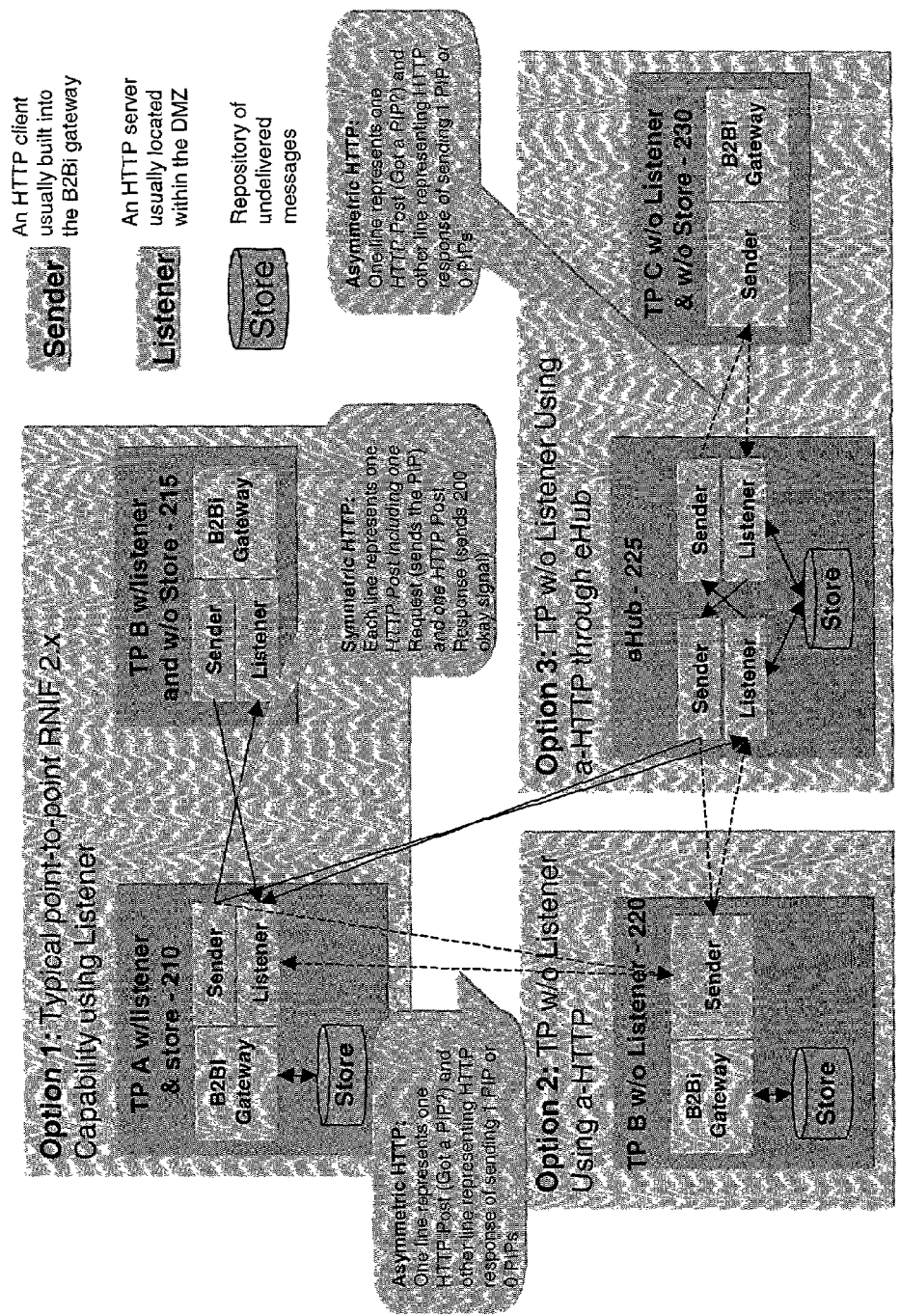
FIG. 2 illustrates the architecture of the present invention.

Referring to FIG. 2, the system architecture employed by the present invention is illustrated. FIG. 2 illustrates various options that may be used for transferring business messages between trading partners in a network environment. Option 1 shown in FIG. 2 illustrates the conventional point-to-point trading partner communication protocol using a symmetric HTTP protocol such as the prior art system illustrated in FIG. 1 and described above. Because of the constraints of the prior art system as described above, each of the trading partners (TP-A 210 and TP-B 215) include a listener component for receiving business messages transferred from the sender component of another network-linked trading partner. Similarly, as described above in connection with FIG. 1, a conventional trading partner can send business messages to another trading partner through a hub, such as hub 225 illustrated in FIG. 2. These conventional symmetric HTTP transfers either directly between trading partners or via a hub are shown as solid arrows between senders and listeners as shown in FIG. 2.

The present invention improves the business message exchange protocol of the prior art by providing an asymmetric HTTP protocol. The asymmetric HTTP protocol is shown primarily as options 2 and 3 as shown in FIG. 2. Referring to option 2 as shown in FIG. 2, a trading partner B 220 without a listener component is shown. In this configuration, trading partner B 220 includes only a sender component and a gateway component. Optionally, the trading partner may include a data store for retaining information in a persistent manner. Because trading partner B 220 can be implemented in the present invention without a listener component, the cost of implementing trading partner 220 is greatly diminished. Using the asymmetric HTTP protocol of the present invention, trading partner B 220 can initiate the transfer of business messages to another trading partner in the networked environment. The data transfers between trading partners using an asymmetric HTTP protocol is shown in FIG. 2 as dashed lines between trading partners. As shown in option 2 of FIG. 2, the sender component of trading partner B 220 can issue a business transaction request to the listener component of trading partner A 210. In response, the sender component of trading partner A 210 sends zero or more PIPs back to trading B 220 in response to the initial request. Similarly, using option 3 illustrated in FIG. 2, trading partner B 220 without a listener can initiate a business transaction with trading partner C 230, also without a listener, using an intervening hub 225. In this general transaction type provided by the present invention, trading partner B 220 sends a business transaction polling message to the listener component of hub 225. The listener component of hub 225 can transfer the polling request to a data store coupled to hub 225 for persistent retention. In a separate transaction, trading partner C 230 also without a listener, and in this example without a data store, sends a business polling request to a listener component of hub 225. Again, the listener component of hub 225 may store the polling request in a data store coupled to hub 225. Hub 225 may also take note that a pending request associated with trading partner C 230 has been posted by another trading partner. In this case, the pending request can be retrieved and sent on to the destination trading partner via hub 225. Thus, in the manner described in more detail below, the asymmetric HTTP protocol of the present invention provides a lower cost implementation supporting e-commerce business transactions.

FIGS. 3–10 illustrate the protocol used in one embodiment of the present invention. Because the present invention allows client devices without always-active listening components to participate in the invented e-commerce system, the present invention employs a novel e-commerce business transaction protocol as part of the invented system. This protocol is illustrated in the several examples shown in FIGS. 3–10. In each of FIGS. 3–10, a representative HTTP client device trading partner A 320 is shown as one participant in a series of electronic commerce business transactions with a second participant, HTTP server trading partner B 310 also shown in each of FIGS. 3–10. As will be clear from the description of the protocol of the present invention as provided below, client trading partner A 320 is able to perform each of the necessary steps in an e-commerce business transaction with server trading partner B 310, even though client 320 does not include an always active listening component as typical in prior art systems.

Figure 3:
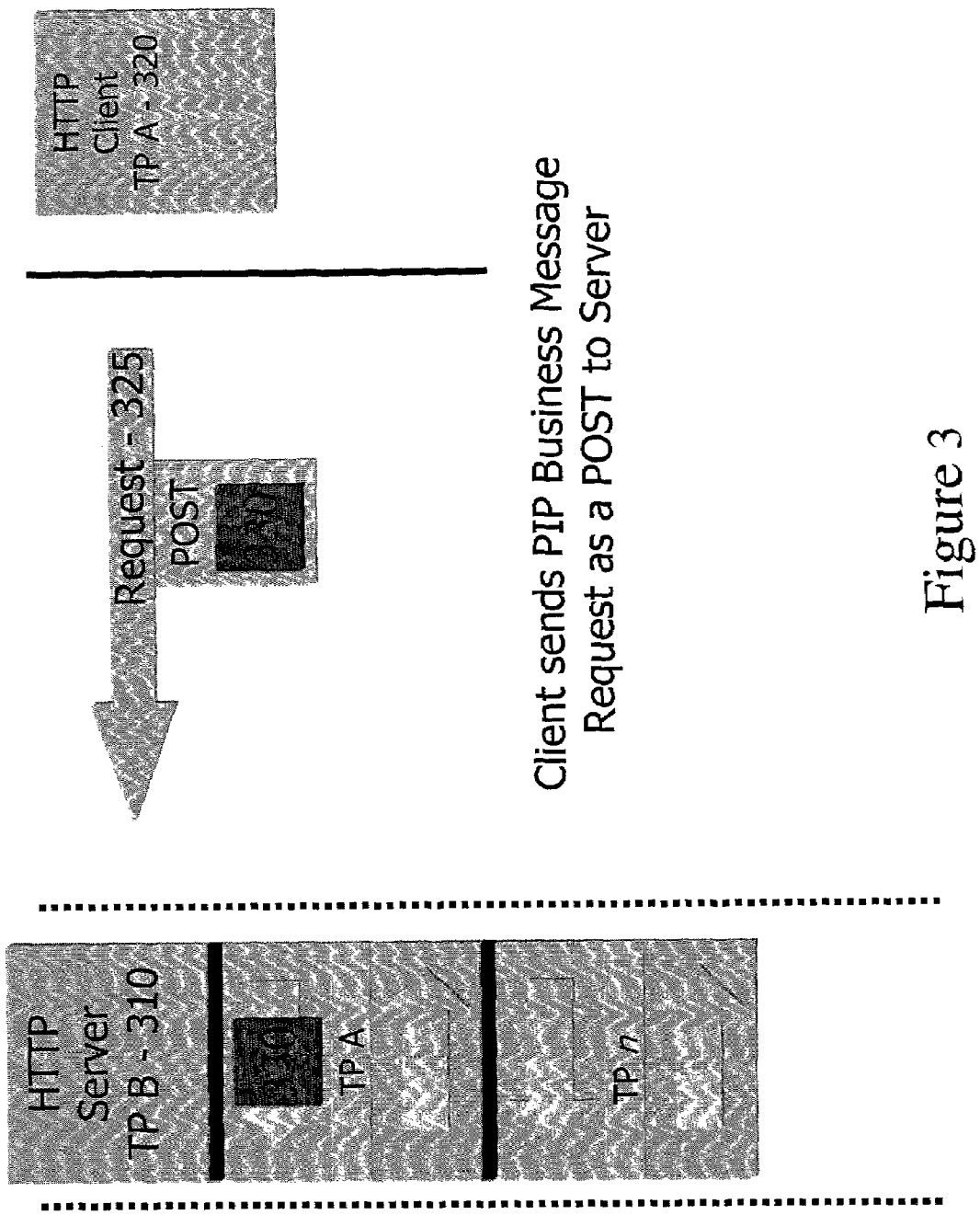
FIGS. 3–12 illustrate the protocol and process flow used by one embodiment of the present invention.

Referring now to FIG. 3, client 320 wishes to send a business message to server 310. Such a business message can be a PIP as specified in the RosettaNet specification, for example. It will be apparent to those of ordinary skill in the art however that any type of business message can be sent from client 320 to server 310. In one embodiment of the present invention, the business message is sent by client 320 as an HTTP POST message request 325. In a conventional manner, additional data can be attached to a standard HTTP POST request. In the present invention, this additional data attached to the request 325 is a business message 330 representing an electronic commerce business transaction for processing by server 310 or another device. Server 310 receives the POST request 325 with the attached business message request 330. The server 310 retrieves the business message request 330 from request 325 and stores the business message in a data store.

Figure 4:
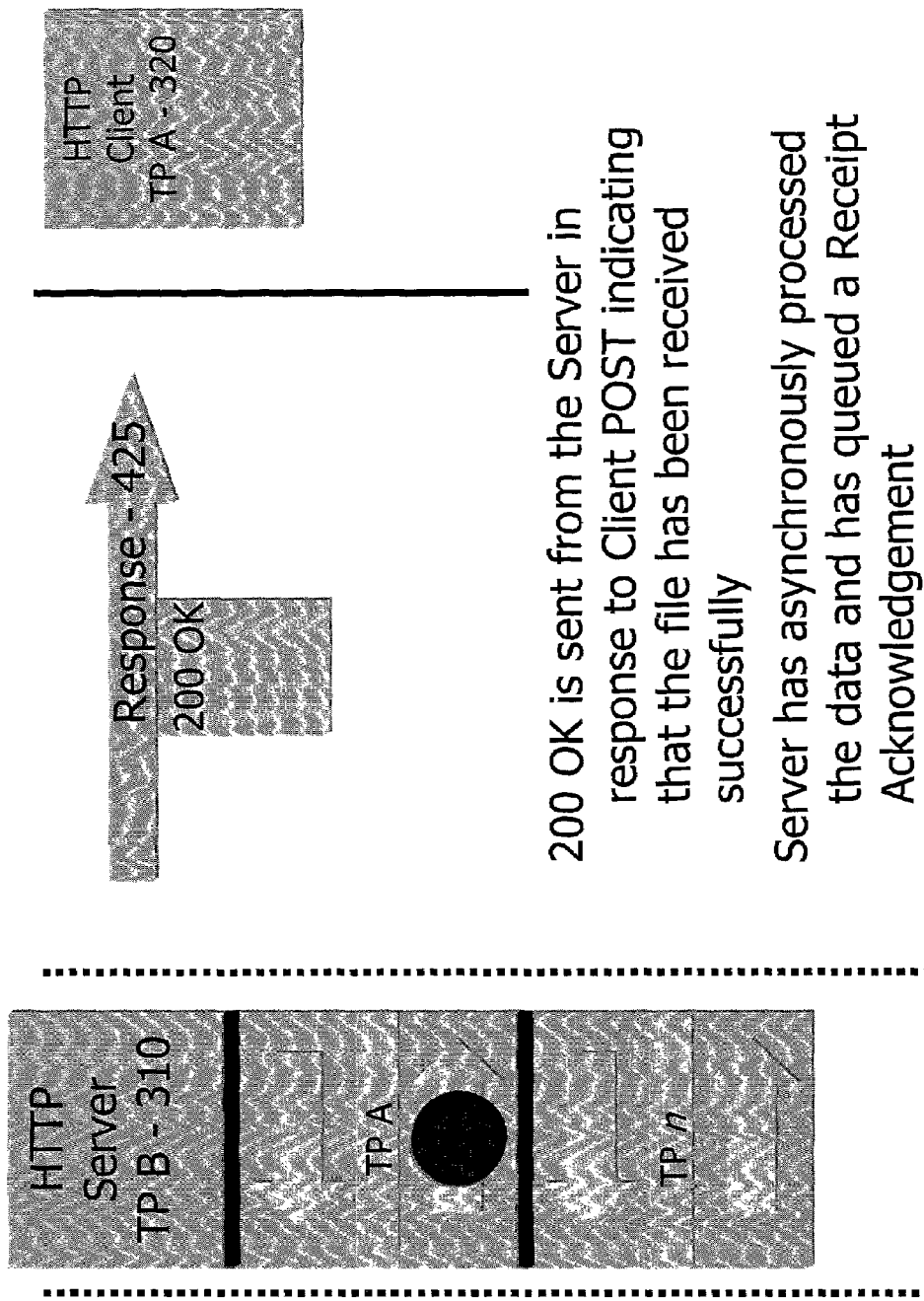

Referring now to FIG. 4, the server 310 has received and stored business message 330 from client 320. As a response to client 320, server 310 sends a response 425 to client 320 using a standard HTTP POST acknowledgement such as the 200 OK signal provided as part of the HTTP specification. Client 320 receives response 425 indicating that server 310 has successfully received the previously sent business message 330. Subsequently, server 310 can process business message 330 and produce a result or a status indication. This result or status indication produced by server 310 can be embodied in a receipt acknowledgement 430 temporarily retained in a server 310 data store until a subsequent time when client 320 polls server 310 for additional data.

Figure 5:
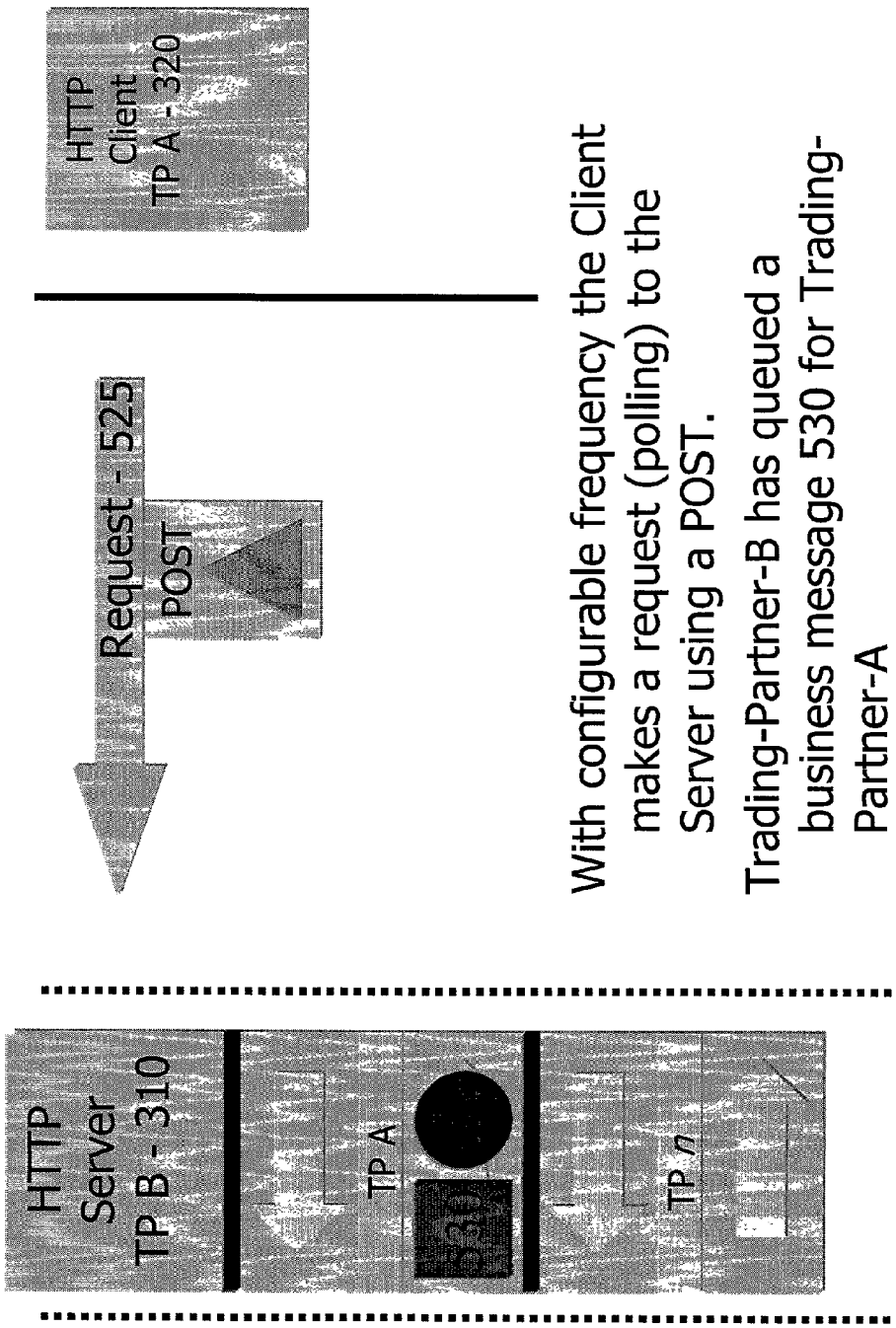

Referring now to FIG. 5, the previously generated receipt acknowledgement information 430 is being held by server 310. In addition, server 310 has queued a business message 530 for transfer to client 320. However, because server 310 cannot initiate a transfer to a client without an always-active listening component, server 310 must retain the request acknowledgement 430 and business message 530 until client 320 again polls server 310 for information. As shown in FIG. 5, client 320 has sent a polling request 525 to server 310. In one embodiment of the present invention, this polling request 525 is implemented as a conventional HTTP POST message with additional information indicating the polling request. The client 320 can be configured to send a polling request 525 to server 310 at configurable intervals or with configurable frequency.

Figure 6:
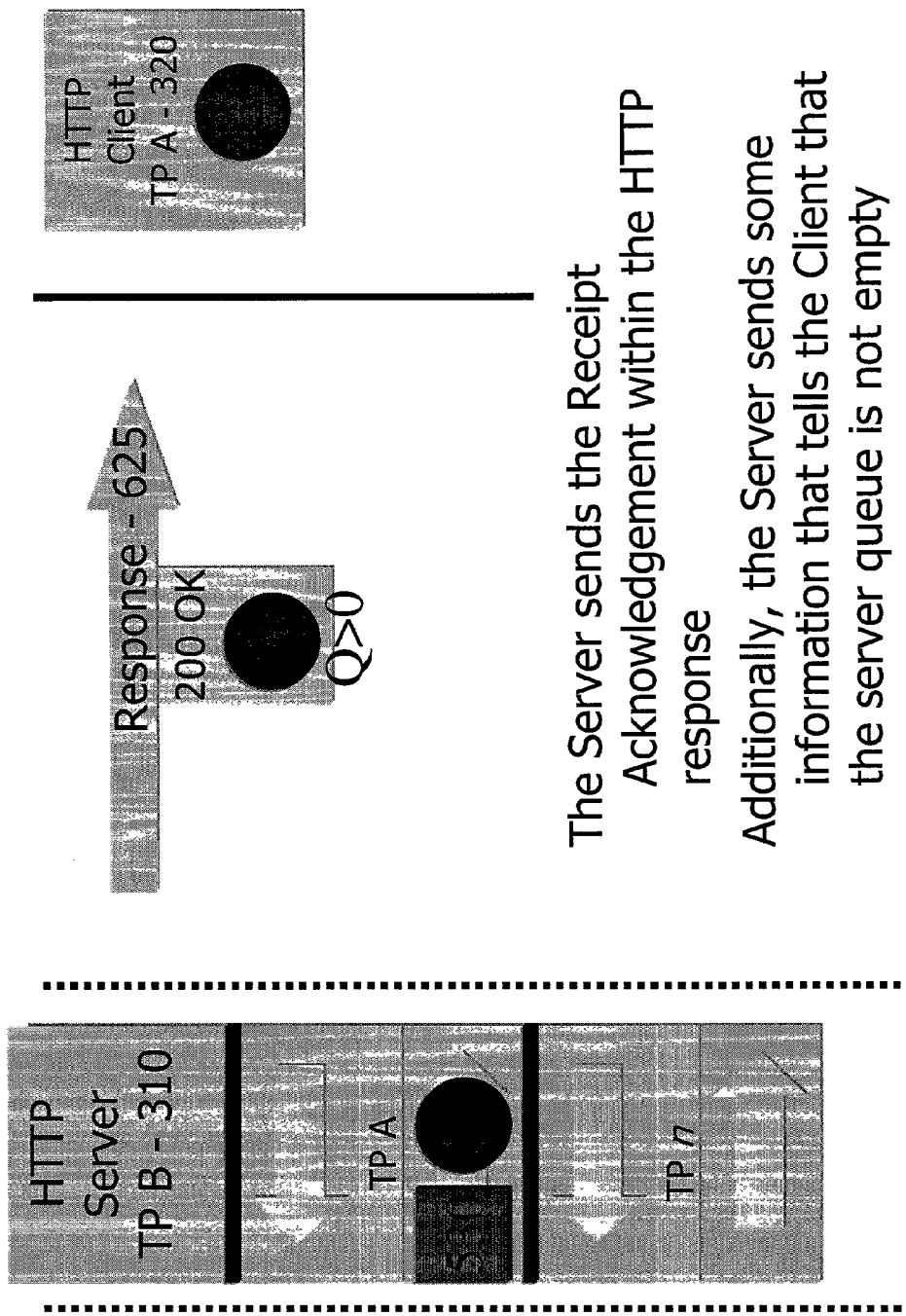

Referring to FIG. 6, server 310 has previously received polling request 525 from client 320. In response to this polling request, server 310 sends a response 625 back to client 320. Response 625 acknowledges the server 310 receipt of the polling request and additionally sends the receipt acknowledgement 430 back to client 320 within the HTTP response 625. In addition, server 310 sends additional information with response 625 indicating to client 320 that a message queue within server 310 is not empty. By indicating to client 320 that the server's queue is not empty, server 310 is prompting client 320 to subsequently request the transfer of any messages being retained by server 310 for delivery to client 320.

Figure 7:
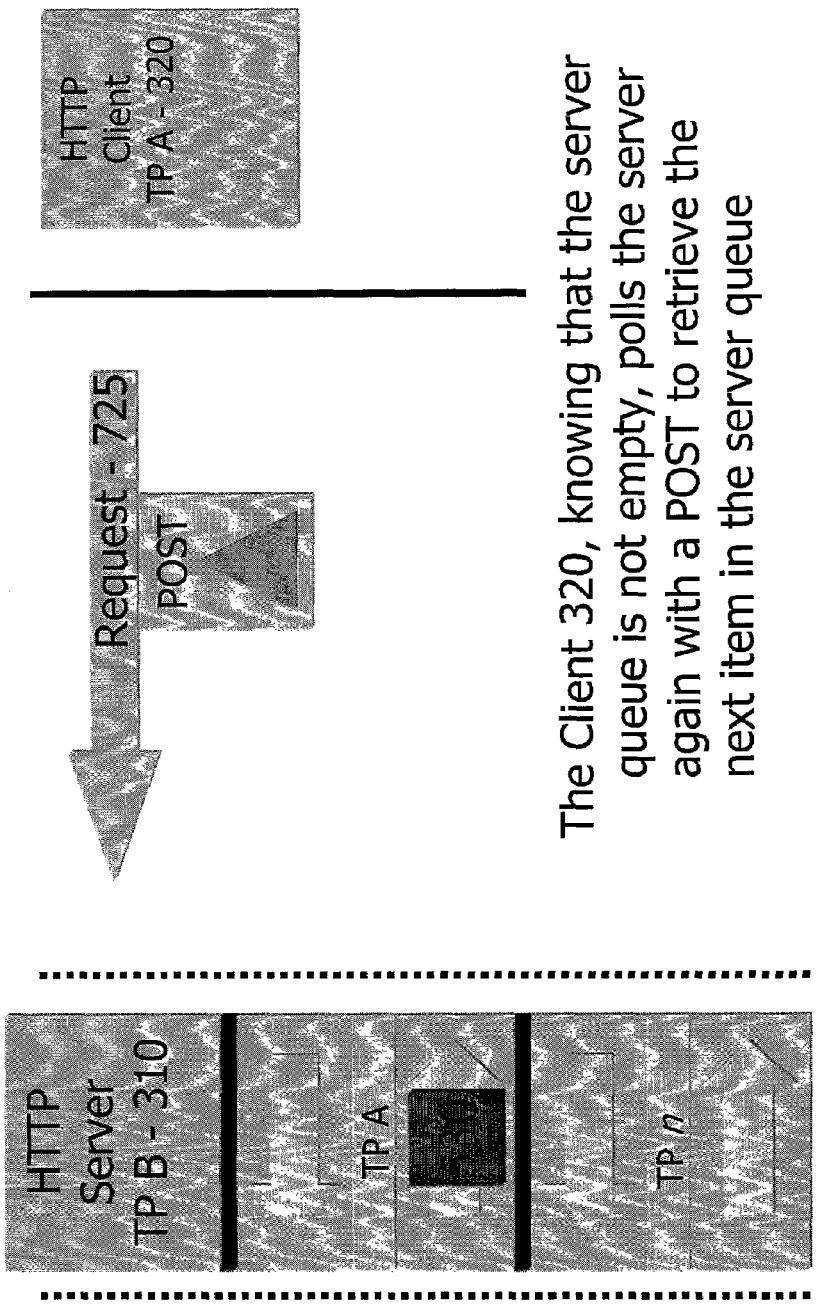

Referring to FIG. 7, client 320 has previously received an indication from server 310 that the message queue in server 310 is not empty. In response to this information, client 320 sends request 725 to server 310. This polling request 725 sent by client 320 is interpreted by server 310 as a request by client 320 for messages retained in the message queue of server 310. Again, polling request 725 is implemented in one embodiment of the present invention as a conventional HTTP POST message.

Figure 8:
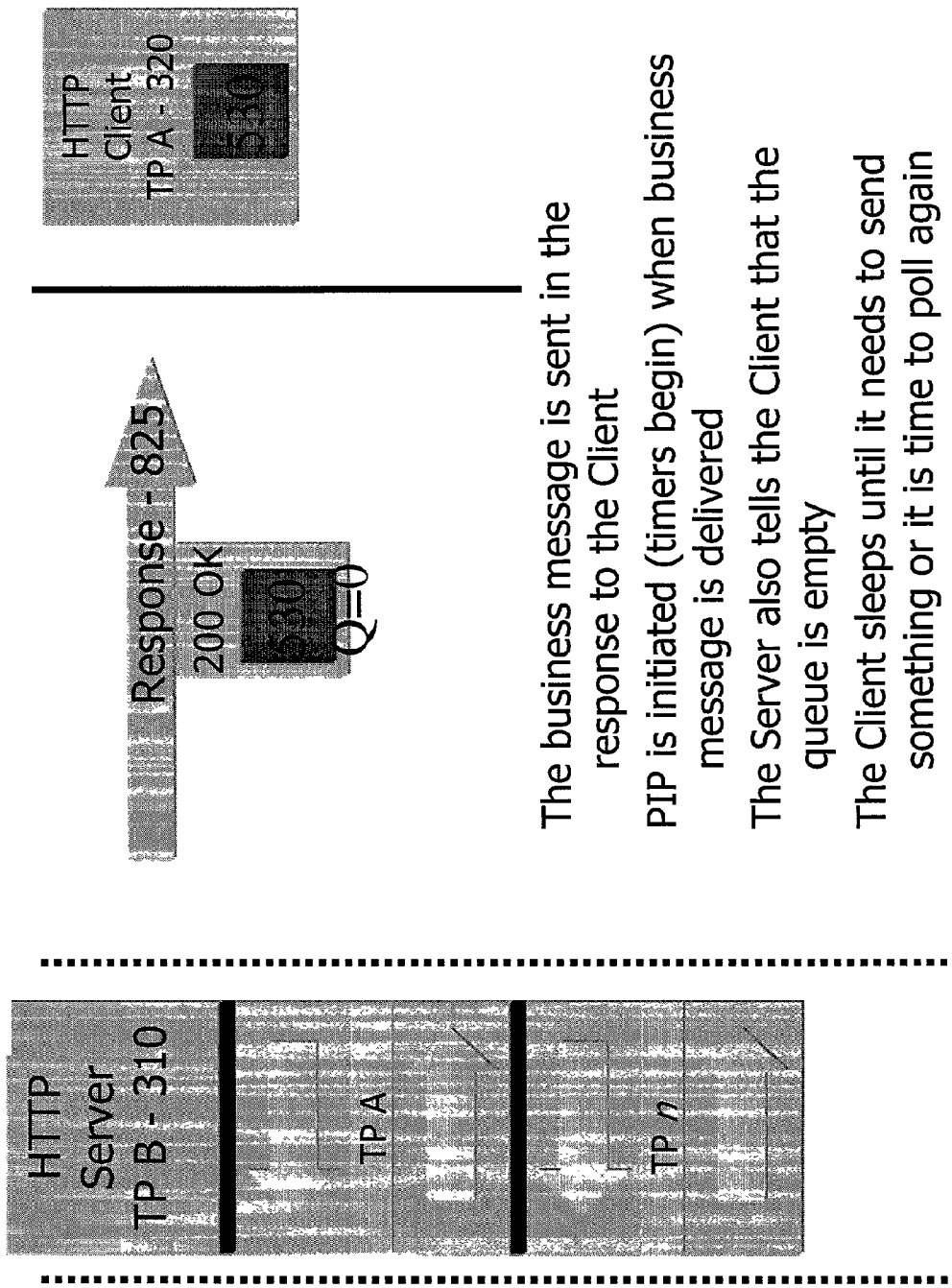

Referring now to FIG. 8, server 310 has previously received polling request 725 from client 320. In response to this request, server 310 assembles response 825. Response 825, implemented as an HTTP POST response, includes business message 530 previously retained in a queue in server 310. Using response 825, server 310 retrieves business message 530 from its queue and transfers this business message to client 320 with response 825. In addition, server 310 includes information in response 825 indicating that the message queue in server 310 is empty. As a result of receiving response 825, client 320 retrieves business message 530 and stores the business message for later processing in its data store. In addition, because client 320 also receives information from server 310 that the message queue in server 310 no longer has additional messages addressed to client 320, client 320 may suspend further requests to server 310 until the next polling cycle occurs. Once business message 530 is received by client 320, the business message can be processed in a conventional manner by client 320. As a result of client 320 processing business message 530, a result or a status indication can be produced by client 320.

Figure 9:
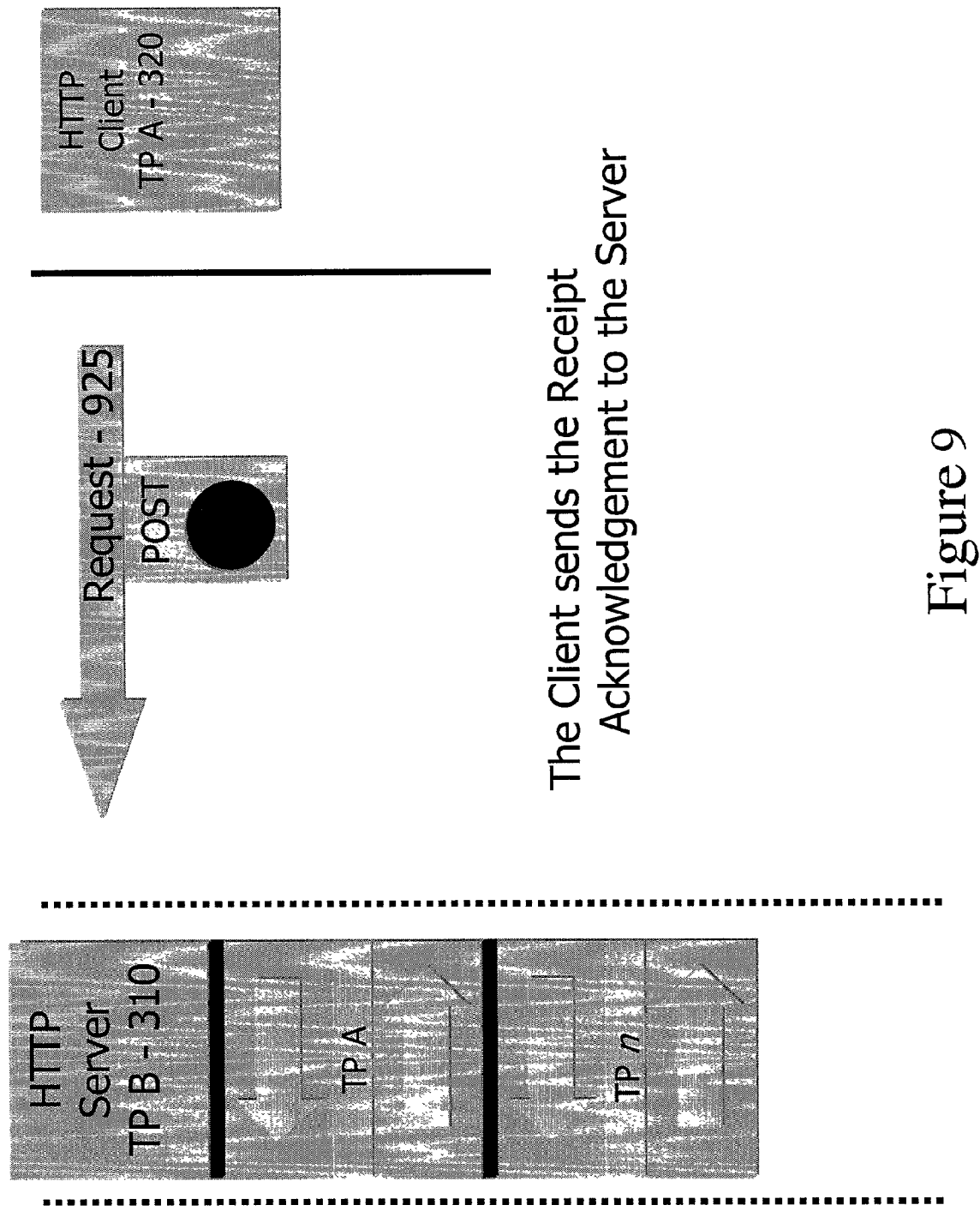

Referring now to FIG. 9, client 320 has completed the processing of business message 530 and has produced a result or a status indication embodied in receipt acknowledgement 930. As shown in FIG. 9, client 320 assembles a request message 925 including the information or status associated with the processing of business message 530 and embodied in receipt acknowledgement 930. Request 925 can be implemented as a conventional HTTP POST message. This message is received by server 310.

Figure 10:
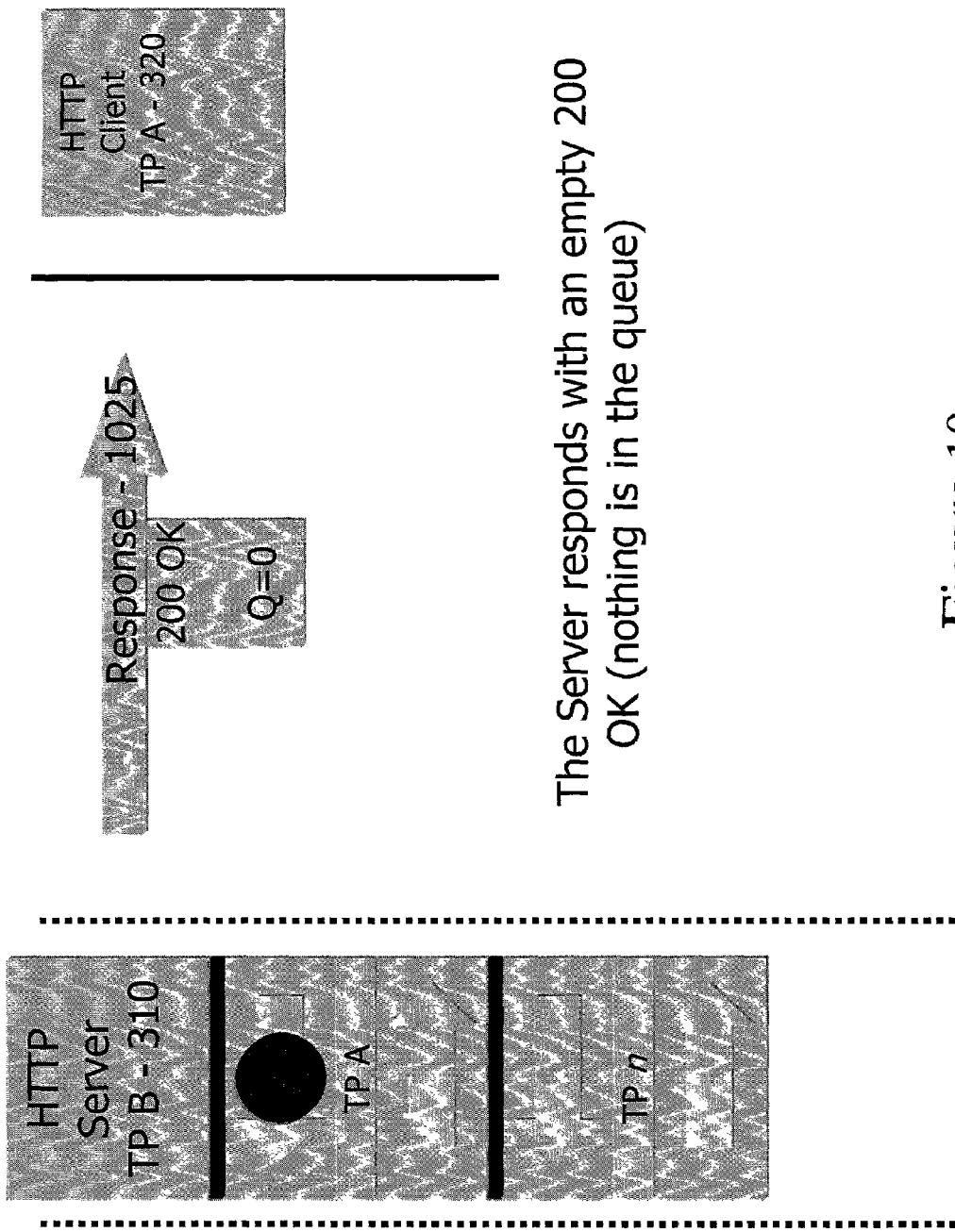

Referring now to FIG. 10, server 310 receives request 925 with the receipt acknowledgement information 930 attached. Receipt acknowledgement information 930 is retrieved by server 310. Finally, server 310 produces a response message 1025 for transfer to client 320. In addition to indicating the successful receipt of receipt acknowledgement 930, server 310 also provides additional information that its message queue is empty. As a result of receiving this information, client 320 can suspend further communication with server 310 until the next client 320 polling cycle occurs.

Figure 11:
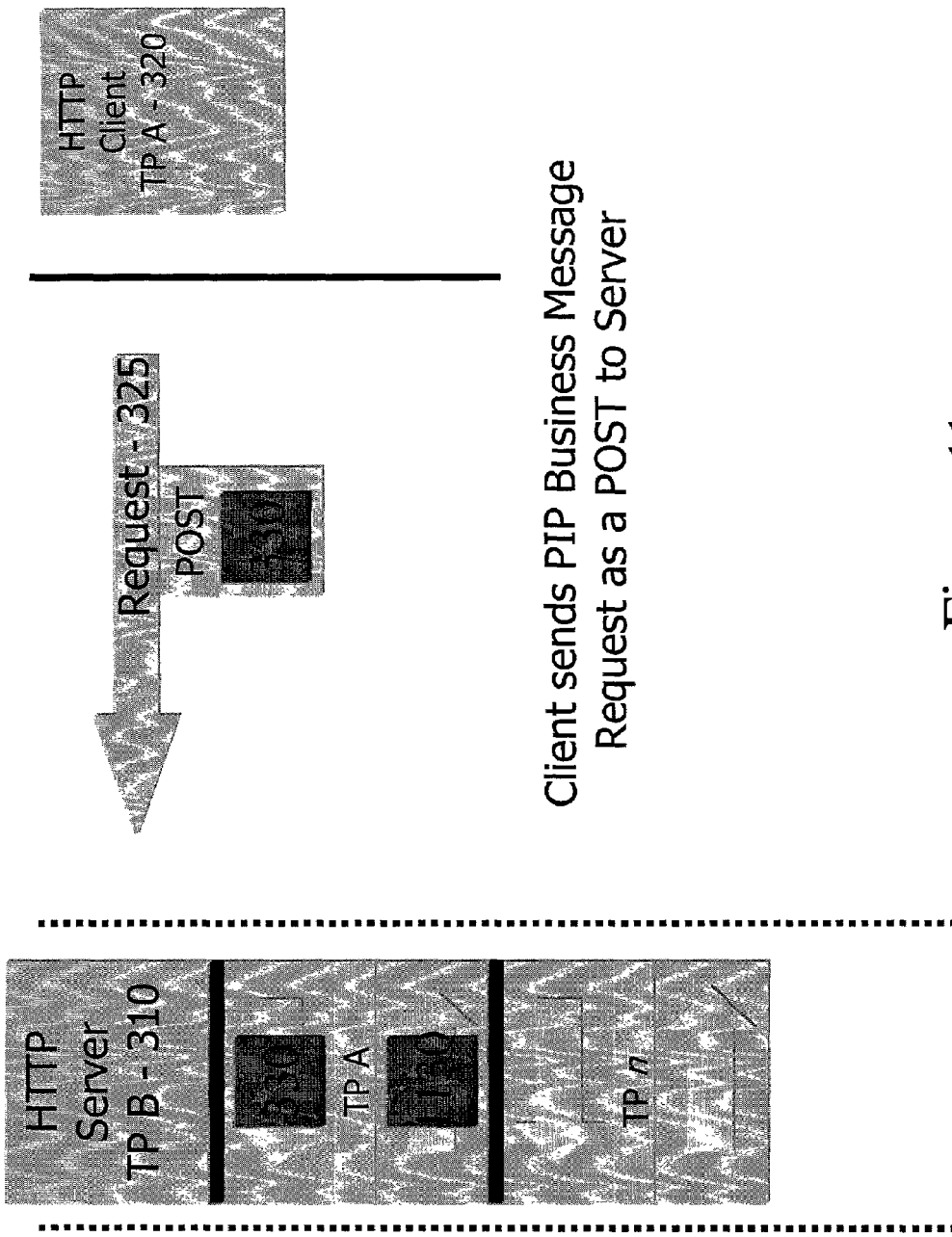
Figure 12:
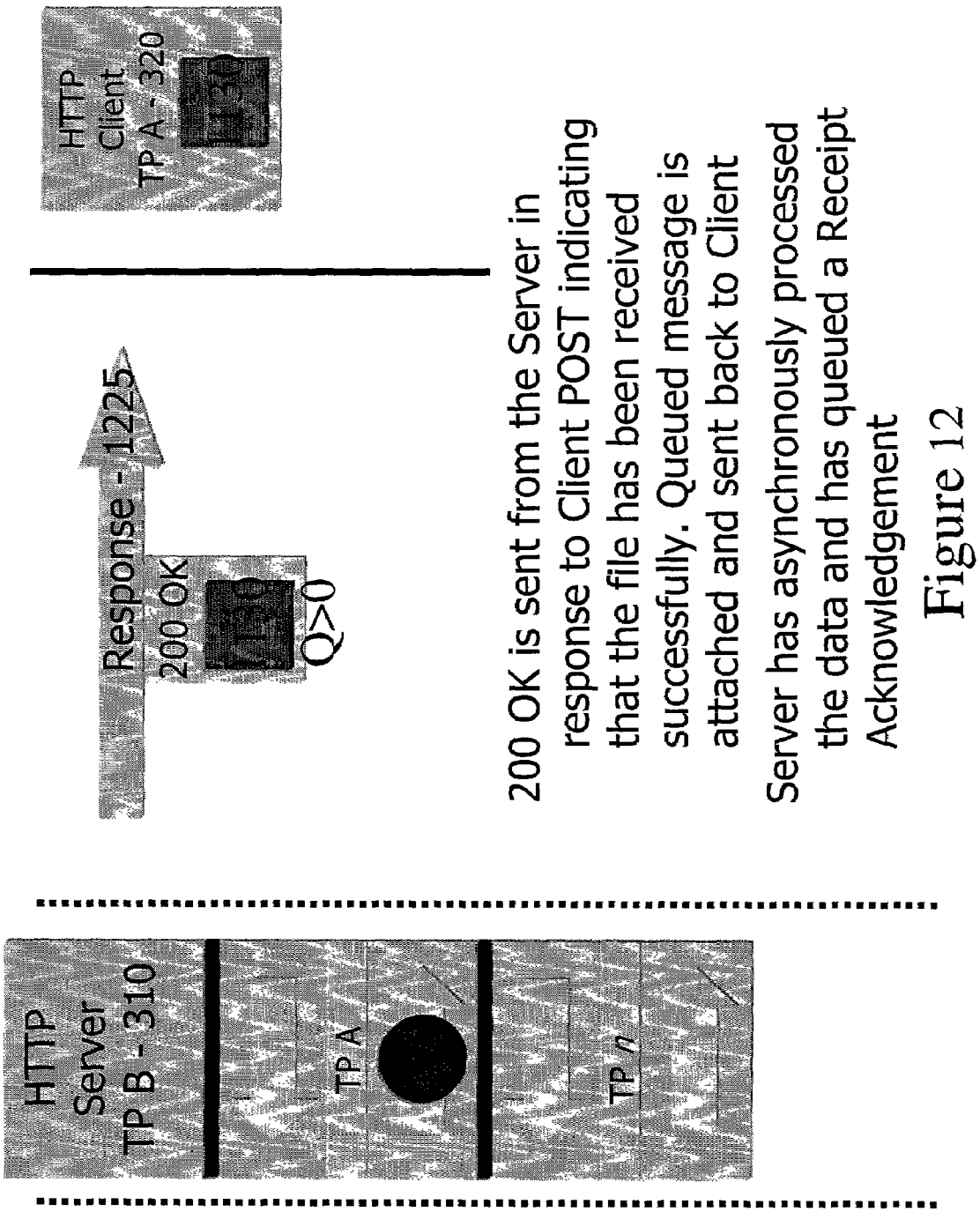

Referring now to FIG. 11, client 320 wishes to send a business message to server 310 in a manner similar to that described above in connection with FIG. 3. In this case, however, the client 310 also has a message 1130 previously queued by the server 310. As described above, the client 320 sends its business message 330 to server 310, which stores the message 330 for processing. As shown in FIG. 12, server 310 responds to the client 320 transmission of message 330 with the standard 200 OK response 1225. However, in this case, server 310 also attaches message 1130, which was previously queued by server 310 for delivery to client 320. Server 310 also includes in the response 1225 an indication that the server 310 message queue for client 320 is not empty, because of a previously queued receipt acknowledgement 430. In this manner, client 320 can receive a previously queued message in response to a transaction other than a polling request.

Figure 13:
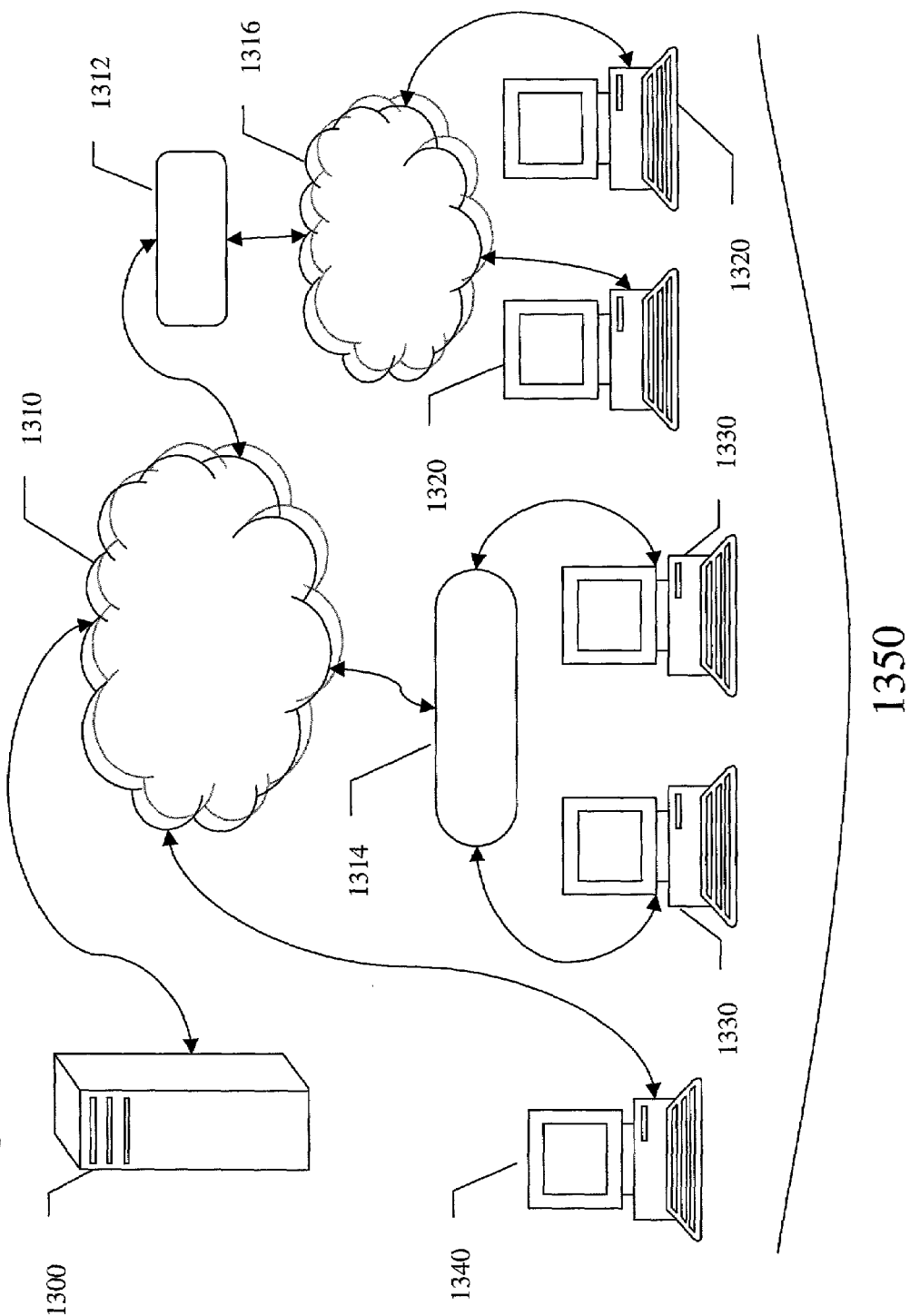
FIGS. 13, 14a and 14b illustrate a typical network and computer environment in which the invention can operate.

Referring now to FIG. 13, a diagram illustrates the network environment in which the present invention operates. In this conventional network architecture, a server computer system 1300 is coupled to a wide-area network 1310. Wide-area network 1310 includes the Internet, or other proprietary networks including America On-Line™, CompuServe™, Microsoft Network™, and Prodigy™, each of which are well known to those of ordinary skill in the art. Wide-area network 1310 may include conventional network backbones, long-haul telephone lines, Internet service providers, various levels of network routers, and other conventional means for routing data between computers. Using conventional network protocols, server 1300 may communicate through wide-area network 1310 to a plurality of client computer systems 1320, 1330, 1340 connected through wide-area network 1310 in various ways. For example, client 1340 is connected directly to wide-area network 1310 through direct or dial up telephone or other network transmission line. Alternatively, clients 1330 may be connected through wide-area network 1310 using a modem pool 1314. A conventional modem pool 1314 allows a plurality of client systems to connect with a smaller set of modems in modem pool 1314 for connection through wide-area network 1310. In another alternative network topology, wide-area network 1310 is connected to a gateway computer 1312. Gateway computer 1312 is used to route data to clients 1320 through a local area network (LAN) 1316. In this manner, clients 1320 can communicate with each other through local area network 1316 or with server 1300 through gateway 1312 and wide-area network 1310.

Using one of a variety of network connection means, server computer 1300 can communicate with client computers 1350 using conventional means. In a particular implementation of this network configuration, a server computer 1300 may operate as a web server if the World-Wide Web (WWW) portion of the Internet is used for wide area network 1310. Using the HTTP protocol and the HTML or XML coding language across wide-area network 1310, web server 1300 may communicate across the World-Wide Web with clients 1350. In this configuration, clients 1350 use a client application program known as a web browser such as the Netscape™ Navigator™ formerly published by Netscape Corporation of Mountain View, Calif., the Internet Explorer™ published by Microsoft Corporation of Redmond, Wash., the user interface of America On-Line™, or the web browser or HTML/XML translator or any other well-known supplier. Using such conventional browsers and the World-Wide Web, clients 1350 may access image, graphical, and textual data provided by web server 1300 or run Web application software. Conventional means exist by which clients 1350 may supply information to web server 1300 through the World-Wide Web 1310 and the web server 1300 may return processed data to clients 1350.

Figure 14A:
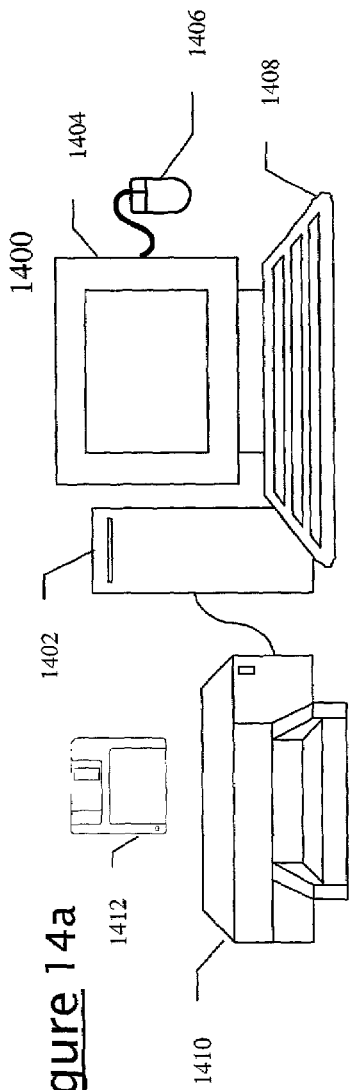
Figure 14B:
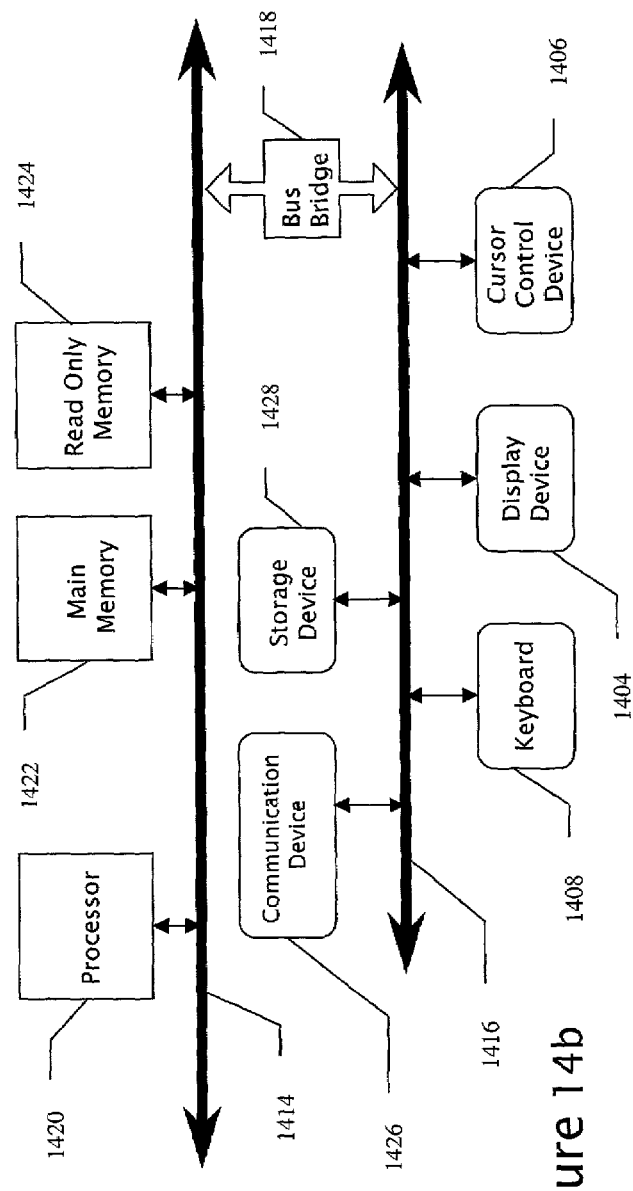

Having briefly described one embodiment of the network environment in which the present invention operates, FIGS. 14a and 14b illustrate an example of a computer system 1400 illustrating an exemplary client 1350 or server 1300 computer system in which the features of the present invention may be implemented. Computer system 1400 is comprised of a bus or other communications means 1414 and 1416 for communicating information, and a processing means such as processor 1420 coupled with bus 1414 for processing information. Computer system 1400 further comprises a random access memory (RAM) or other dynamic storage device 1422 (commonly referred to as main memory), coupled to bus 1414 for storing information and instructions to be executed by processor 1420. Main memory 1422 also may be used for storing temporary variables or other intermediate information during execution of instructions by processor 1420. Computer system 1400 also comprises a read only memory (ROM) and/or other static storage device 1424 coupled to bus 1414 for storing static information and instructions for processor 1420.

An optional data storage device 1412 such as a magnetic disk or optical disk and its corresponding drive may also be coupled to computer system 1400 for storing information and instructions. Computer system 1400 can also be coupled via bus 1416 to a display device 1404, such as a cathode ray tube (CRT) or a liquid crystal display (LCD), for displaying information to a computer user. For example, image, textual, or graphical depictions of product data and other types of image, graphical, or textual information may be presented to the user on display device 1404. Typically, an alphanumeric input device 1408, including alphanumeric and other keys is coupled to bus 1416 for communicating information and/or command selections to processor 1420. Another type of user input device is cursor control device 1406, such as a conventional mouse, trackball, or other type of cursor direction keys for communicating direction information and command selection to processor 1420 and for controlling cursor movement on display 1404.

Alternatively, the client 1350 can be implemented as a network computer or thin client device, such as the WebTV Networks™ Internet terminal or the Oracle™ NC. Client 1350 may also be a laptop or palm-top computing device, such as the Palm Pilot™. Client 1350 could also be implemented in a robust cellular telephone, where such devices are currently being used with Internet micro-browsers. Such a network computer or thin client device does not necessarily include all of the devices and features of the above-described exemplary computer system; however, the functionality of the present invention or a subset thereof may nevertheless be implemented with such devices.

A communication device 1426 is also coupled to bus 1416 for accessing remote computers or servers, such as web server 1300, or other servers via the Internet, for example. The communication device 1426 may include a modem, a network interface card, or other well-known interface devices, such as those used for interfacing with Ethernet, Token-ring, or other types of networks. In any event, in this manner, the computer system 1400 may be coupled to a number of servers 1300 via a conventional network infrastructure such as the infrastructure illustrated in FIG. 13 and described above.

The system of the present invention includes software, information processing hardware, and various processing steps. The features and process steps of the present invention may be embodied in machine or computer executable instructions. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While embodiments of the present invention will be described with reference to the World-Wide Web, the method and apparatus described herein is equally applicable to other network infrastructures or other data communications systems.

Thus, an asymmetric electronic commerce system and method is disclosed.

What is claimed is:

1. An asymmetric e-commerce transaction method, comprising:

sending a business message to a server, the business message having additional data attached;

receiving a response from the server confirming the business message was received;

sending a polling request to the server;

receiving a second response from the server confirming the polling request was received, the second response further including a first receipt acknowledgement of a result of processing the business message and indicating a message queue associated with the server is not empty;

sending a second polling request to the server in response to the indication the message queue is not empty;

receiving a third response from the server including a second business message including the result of processing the business message, the third response indicating the message queue is empty;

storing the second business message; and sending a second receipt acknowledgement including a result of processing the second business message to the server.

2. The asymmetric e-commerce transaction method of claim 1, further comprising suspending further requests in response to the indication the message queue is empty until the next polling cycle.

3. The asymmetric e-commerce transaction method of claim 1, further comprising receiving from the server a fourth response, the fourth response including a receipt acknowledgement and further indicating the message queue is empty, and awaiting communication with the server until a next polling cycle.

4. The asymmetric e-commerce transaction method of claim 1, wherein the business message is an HTTP POST message request.

5. The asymmetric e-commerce transaction method of claim 1, wherein the additional data is a business message representing an electronic commerce business transaction.

6. The asymmetric e-commerce transaction method of claim 1, wherein the response is a standard HTTP POST acknowledgement.

7. The asymmetric e-commerce transaction method of claim 1, wherein the second polling request is interpreted by the server as a request for messages in the message queue.

8. The asymmetric e-commerce transaction method of claim 1, wherein at least one of the polling request and the second polling request is an HTTP POST message.

9. The asymmetric e-commerce transaction method of claim 1, wherein at least one of the second response and the third response is an HTTP POST response.

10. The asymmetric e-commerce transaction method of claim 1, wherein the polling request is sent at configurable intervals or with configurable frequency.

11. The asymmetric e-commerce transaction method of claim 1, wherein the request message includes a receipt acknowledgement comprising at least one of the information or status associated with processing of the second business message.

12. The asymmetric e-commerce transaction method of claim 1, wherein the server is a hub comprising at least one each of a listening component, a sending component and a data store.

13. The asymmetric e-commerce transaction method of claim 1, wherein the business message is sent by a first trading partner, and the polling request is sent by a second trading partner.

14. The asymmetric e-commerce transaction method of claim 1, wherein the server is located at a first trading partner and the client is located at a second trading partner.

15. An asymmetric e-commerce transaction method, comprising:
- receiving a business message from a client, the business message having additional data attached, the data being moved to a data store for subsequent processing;
- sending a response to the client confirming the business message was received;
- receiving a polling request from the client;
- sending a second response to the client confirming the polling request was received, the second response including a first receipt acknowledgement of a result of processing the business message and further indicating an associated message queue is not empty;
- receiving a second polling request from the client in response to the indication the message queue is not empty;
- sending a third response to the client including a second business message including the result of processing the business message, the third response indicating the message queue is empty; and
- receiving a second receipt acknowledgement including a result of processing the second business message from the client.

16. The asymmetric e-commerce transaction method of claim 15, further comprising sending to the client a fourth response, the fourth response including a receipt acknowledgement and further indicating the message queue is empty, and awaiting communication with the client until a next polling cycle.

17. The asymmetric e-commerce transaction method of claim 15, wherein the business message is an HTTP POST message request.

18. The asymmetric e-commerce transaction method of claim 15, wherein the additional data is a business message representing an electronic commerce business transaction.

19. The asymmetric e-commerce transaction method of claim 15, wherein the response is a standard HTTP POST acknowledgement.

20. The asymmetric e-commerce transaction method of claim 15, wherein the second polling request is interpreted by the server as a request for messages in the message queue.

21. The asymmetric e-commerce transaction method of claim 15, wherein at least one of the polling request and the second polling request is an HTTP POST message.

22. The asymmetric e-commerce transaction method of claim 15, wherein at least one of the second response and the third response is an HTTP POST response.

23. The asymmetric e-commerce transaction method of claim 15, wherein the polling request is received at configurable intervals or with configurable frequency.

24. The asymmetric e-commerce transaction method of claim 15, wherein the request message includes a receipt acknowledgement comprising at least one of the information or status associated with processing of the second business message.

25. The asymmetric e-commerce transaction method of claim 15, wherein the server is a hub comprising at least one each of a listening component, a sending component and a data store.

26. The asymmetric e-commerce transaction method of claim 15, wherein the business message is received from a first trading partner, and the polling request is received from a second trading partner.

27. The asymmetric e-commerce transaction method of claim 15, wherein the server is located at a first trading partner and the client is located at a second trading partner.

* * * * *